United States Patent
Hachtmann

(10) Patent No.: US 9,475,589 B2
(45) Date of Patent: Oct. 25, 2016

(54) SYSTEMS AND APPARATUS FOR WINCH DRUM MECHANISM

(71) Applicant: Google Inc., Mountain View, CA (US)

(72) Inventor: Brian Hachtmann, San Martin, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/137,677

(22) Filed: Dec. 20, 2013

(65) Prior Publication Data

US 2015/0175277 A1   Jun. 25, 2015

(51) Int. Cl.
B66D 3/00 (2006.01)
B64F 3/00 (2006.01)
B66D 1/12 (2006.01)

(52) U.S. Cl.
CPC . *B64F 3/00* (2013.01); *B66D 1/12* (2013.01); *B66D 3/006* (2013.01)

(58) Field of Classification Search
CPC .......... B66D 1/14; B66D 1/34; B66D 3/006; B66D 3/04; B66D 3/12; B66D 3/22; B66D 3/24; B66D 5/02; B66D 5/16
See application file for complete search history.

(56) References Cited

U.S. PATENT DOCUMENTS

| | | | | |
|---|---|---|---|---|
| 172,397 A * | 1/1876 | Dederick | | 254/381 |
| 737,830 A * | 9/1903 | Duryea et al. | | 192/215 |
| 780,733 A * | 1/1905 | Smith | | 192/215 |
| 850,987 A * | 4/1907 | Whitehill | | 254/370 |
| 907,777 A * | 12/1908 | Gillar | | 254/264 |
| 929,520 A * | 7/1909 | Truxal | | 192/215 |
| 937,750 A * | 10/1909 | Auchy | | 192/215 |
| 1,185,320 A * | 5/1916 | Holmes | | 192/215 |
| 2,351,654 A * | 6/1944 | Anderson | | 254/344 |
| 2,898,083 A * | 8/1959 | Kresl | | 254/273 |
| 2,967,596 A * | 1/1961 | Page | | 192/219 |
| 2,973,941 A * | 3/1961 | Lunde | | 242/388.5 |
| 3,744,760 A * | 7/1973 | Uher | | 254/351 |
| 3,766,795 A * | 10/1973 | Priest et al. | | 74/405 |
| 3,876,183 A * | 4/1975 | Strout et al. | | 242/157 R |
| 3,939,729 A * | 2/1976 | Brockelsby | | 74/575 |
| 3,969,950 A * | 7/1976 | Rau et al. | | 74/391 |
| 4,004,780 A * | 1/1977 | Kuzarov | | 254/345 |
| 4,045,001 A * | 8/1977 | Harvey, Jr. | | 254/369 |
| 4,101,085 A * | 7/1978 | Arno | | 242/571.2 |
| 4,106,754 A * | 8/1978 | Kucher | | 254/352 |

(Continued)

FOREIGN PATENT DOCUMENTS

CN      202645861 CN      1/2013
WO      9624552 WO       8/1996

*Primary Examiner* — Emmanuel M Marcelo
*Assistant Examiner* — Michael Gallion
(74) *Attorney, Agent, or Firm* — McDonnell, Boehnen, Hulbert & Berghoff LLP

(57) ABSTRACT

Wind energy systems, such as an Airborne Wind Turbine ("AWT"), may be used to facilitate conversion of kinetic energy to electrical energy. An AWT may include an aerial vehicle that flies in a path to convert kinetic wind energy to electrical energy. The aerial vehicle may be tethered to a ground station via a tether that terminates at a tether termination mount. In one aspect, the ground station may have a motor that may be used, for example, as a winch motor to turn the drum to assist in deployment and/or refraction of the tether and AWT. It may be desirable to be able to switch from an engaged and disengaged condition of the motor. For example, it may be desirable to disengage the motor to help reduce wear on the drivetrain and/or to help reduce loads on the drivetrain.

19 Claims, 13 Drawing Sheets

(56) References Cited

U.S. PATENT DOCUMENTS

| | | | |
|---|---|---|---|
| 4,132,322 A * | 1/1979 | Loesch et al. | 414/313 |
| 4,132,387 A * | 1/1979 | Somerville et al. | 254/340 |
| 4,274,620 A * | 6/1981 | Uher | 254/351 |
| 4,375,343 A * | 3/1983 | Butler | 414/508 |
| 4,456,227 A * | 6/1984 | Notenboom | 254/350 |
| 4,520,998 A | 6/1985 | Flaig | |
| 4,552,340 A * | 11/1985 | Sheppard | 254/358 |
| 4,594,906 A * | 6/1986 | Vincent et al. | 74/15.4 |
| 5,346,153 A * | 9/1994 | Ebey | 242/579 |
| 5,368,279 A * | 11/1994 | Ottemann et al. | 254/342 |
| 5,393,190 A * | 2/1995 | Vickary | 414/420 |
| 5,603,489 A * | 2/1997 | Regal | 254/378 |
| 5,800,105 A * | 9/1998 | Stump | 410/103 |
| 5,921,529 A * | 7/1999 | Wilson et al. | 254/346 |
| 6,059,499 A * | 5/2000 | Bird | 410/103 |
| 6,116,580 A * | 9/2000 | Hull | 254/357 |
| 6,572,083 B1 * | 6/2003 | Topping et al. | 254/375 |
| 7,128,307 B2 * | 10/2006 | Dow | 254/342 |
| 7,159,852 B2 * | 1/2007 | Dow et al. | 254/342 |
| 7,347,306 B2 * | 3/2008 | Ginder | 188/162 |
| 7,543,800 B2 * | 6/2009 | Grapes et al. | 254/376 |
| 7,686,282 B2 * | 3/2010 | Amoss et al. | 254/342 |
| 7,793,919 B2 * | 9/2010 | Guyard | 254/346 |
| 7,967,278 B2 * | 6/2011 | Anderson et al. | 254/356 |
| 8,201,810 B2 * | 6/2012 | Svitavsky | 254/329 |
| 8,434,742 B2 * | 5/2013 | Akhavein et al. | 254/344 |
| 2002/0092454 A1 | 7/2002 | Meyerdierks | |
| 2002/0117654 A1* | 8/2002 | Bartal | 254/323 |
| 2004/0041137 A1* | 3/2004 | Shoji | 254/342 |
| 2006/0278861 A1* | 12/2006 | Leslie | 254/333 |
| 2008/0061277 A1* | 3/2008 | Grapes et al. | 254/352 |
| 2009/0236458 A1* | 9/2009 | Rodrique | 242/374 |
| 2009/0278353 A1* | 11/2009 | Da Costa et al. | 290/44 |
| 2012/0175576 A1 | 7/2012 | Xydias | |
| 2013/0221167 A1 | 8/2013 | Moret | |
| 2013/0285377 A1* | 10/2013 | Tattersfield et al. | 290/44 |
| 2014/0061556 A1* | 3/2014 | Knox | 254/220 |

* cited by examiner

SYSTEMS AND APPARATUS FOR WINCH DRUM MECHANISM

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate a ground station for tethering aerial vehicles such as those employed in crosswind aerial vehicle systems. Crosswind aerial vehicle systems may extract useful power from the wind for various purposes such as, for example, generating electricity, lifting or towing objects or vehicles, etc. Deploying and receiving the aerial vehicles to generate power may present difficulties due to, for example, changing wind conditions and/or turbulent wind conditions. Beneficially, embodiments described herein may allow for more reliable, safe, and efficient deployment and reception of aerial vehicles. These as well as other aspects, advantages, and alternatives will become apparent to those of ordinary skill in the art by reading the following detailed description, with reference where appropriate to the accompanying drawings.

In one aspect, a winch drum assembly is provided. The winch drum assembly may include a base platform and a support bracket coupled to the base platform. The winch drum assembly may include a winch drum that is rotatably coupled to the support bracket via a drive shaft, where the winch drum acts as a rotational load on the drive shaft. The winch drum assembly may further include a tether with one end of the tether coupled to the winch drum either directly or through additional components, where the tether is configured to be wound or unwound from about the winch drum as the winch drum rotates. The winch drum assembly may include a drivetrain coupled to the drive shaft. The winch drum assembly may include a motor. The motor may include a motor drive, a motor output shaft that is coupled to the drivetrain, and a motor housing that includes one or more protrusions. The motor housing may be configured to rotate about the motor output shaft and relative to the support bracket and/or the base platform. The winch drum assembly may include a stop block located in proximity to the motor housing such that rotation of the motor housing in a first direction causes the one or more protrusion to contact the stop block and prevent further rotation of the motor housing about the motor output shaft in the first direction.

In another aspect, a system is provided. The system may include a base platform and a support bracket coupled to the base platform. The system may include a winch drum that is rotatably coupled to the support bracket via a drive shaft, where the winch drum acts as a rotational load on the drive shaft. The system may further include a tether coupled to the winch drum, where the tether is configured to be wound or unwound from about the winch drum as the winch drum rotates. The tether may have a proximate tether end and a distal tether end. The system may include a drivetrain coupled to the drive shaft. The system may include a motor. The motor may include a motor drive, a motor output shaft that is coupled to the drivetrain, and a motor housing that includes one or more protrusions. The motor housing may be configured to rotate about the motor output shaft and relative to the support bracket and/or the base platform. The winch drum assembly may include a stop block located in proximity to the motor housing such that rotation of the motor housing in a first direction causes the one or more protrusion to contact the stop block and prevent further rotation of the motor housing about the motor output shaft in the first direction. The system may include a tether termination mount coupled to the winch drum, where the proximate tether end terminates at the tether termination mount. The system may include an aerial vehicle coupled to the distal tether end.

DETAILED DESCRIPTION

Figure 1:
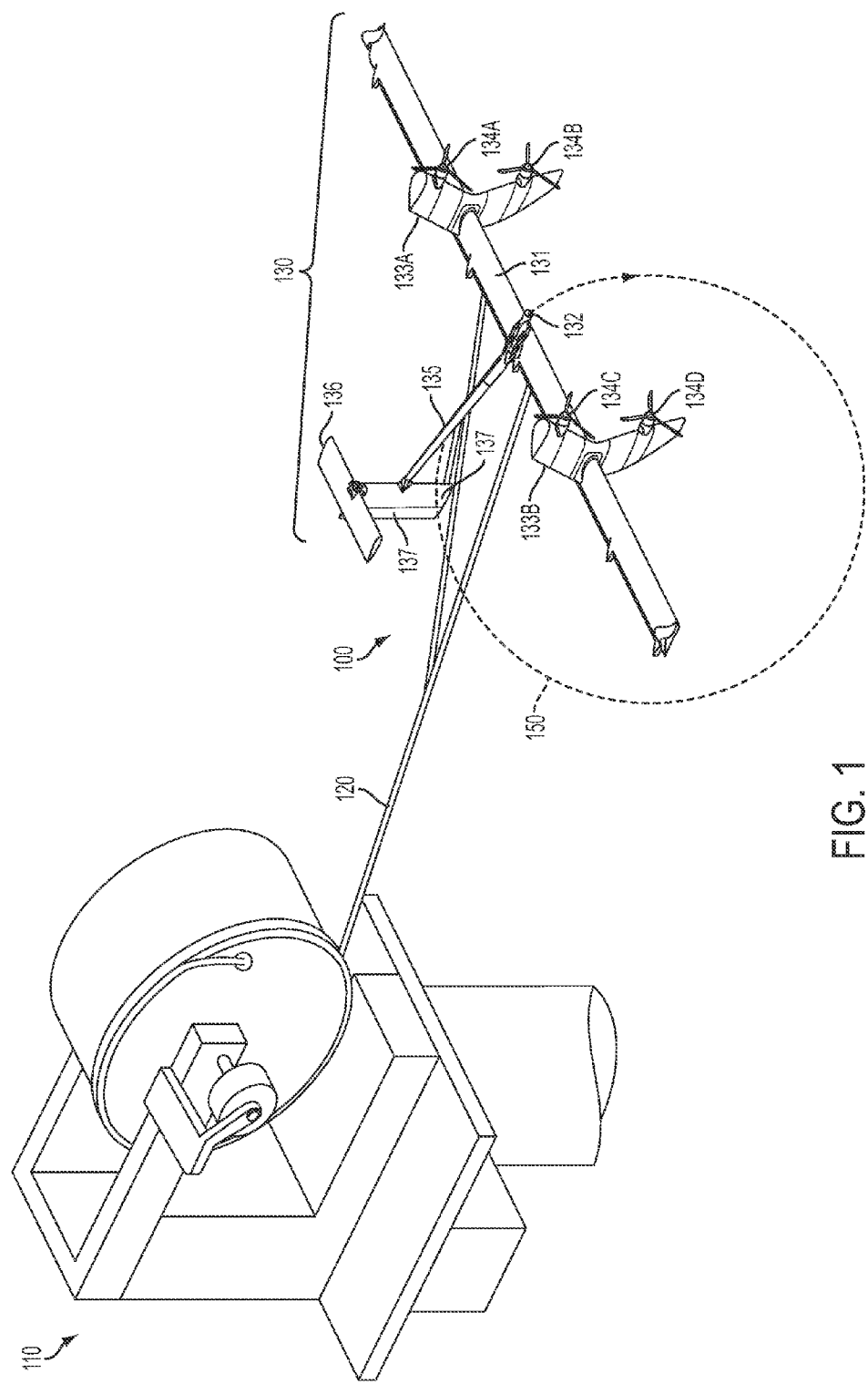
FIG. 1 illustrates an Airborne Wind Turbine (AWT), according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments relate to aerial vehicles, which may be used in a wind energy system, such as an Airborne Wind Turbine (AWT). In particular, example embodiments may relate to or take the form of methods and systems for facilitating an aerial vehicle in the process of conversion of kinetic energy to electrical energy.

By way of background, an AWT may include an aerial vehicle that flies in a path, such as a substantially circular path, to convert kinetic wind energy to electrical energy via onboard turbines. In an example embodiment, the aerial vehicle may be connected to a ground station via a tether. While tethered, the aerial vehicle may: (i) fly at a range of elevations and substantially along the path, and return to the ground, and (ii) transmit electrical energy to the ground station via the tether. In some embodiments, the ground station may transmit electricity to the aerial vehicle for take-off and/or landing.

In an AWT, an aerial vehicle may rest in and/or on a ground station when the wind is not conducive to power generation. When the wind is conducive to power generation, such as when a wind speed may be 10 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while transitioning between hover and crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. However other lengths may be used as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors that may be spaced along main wing 131.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
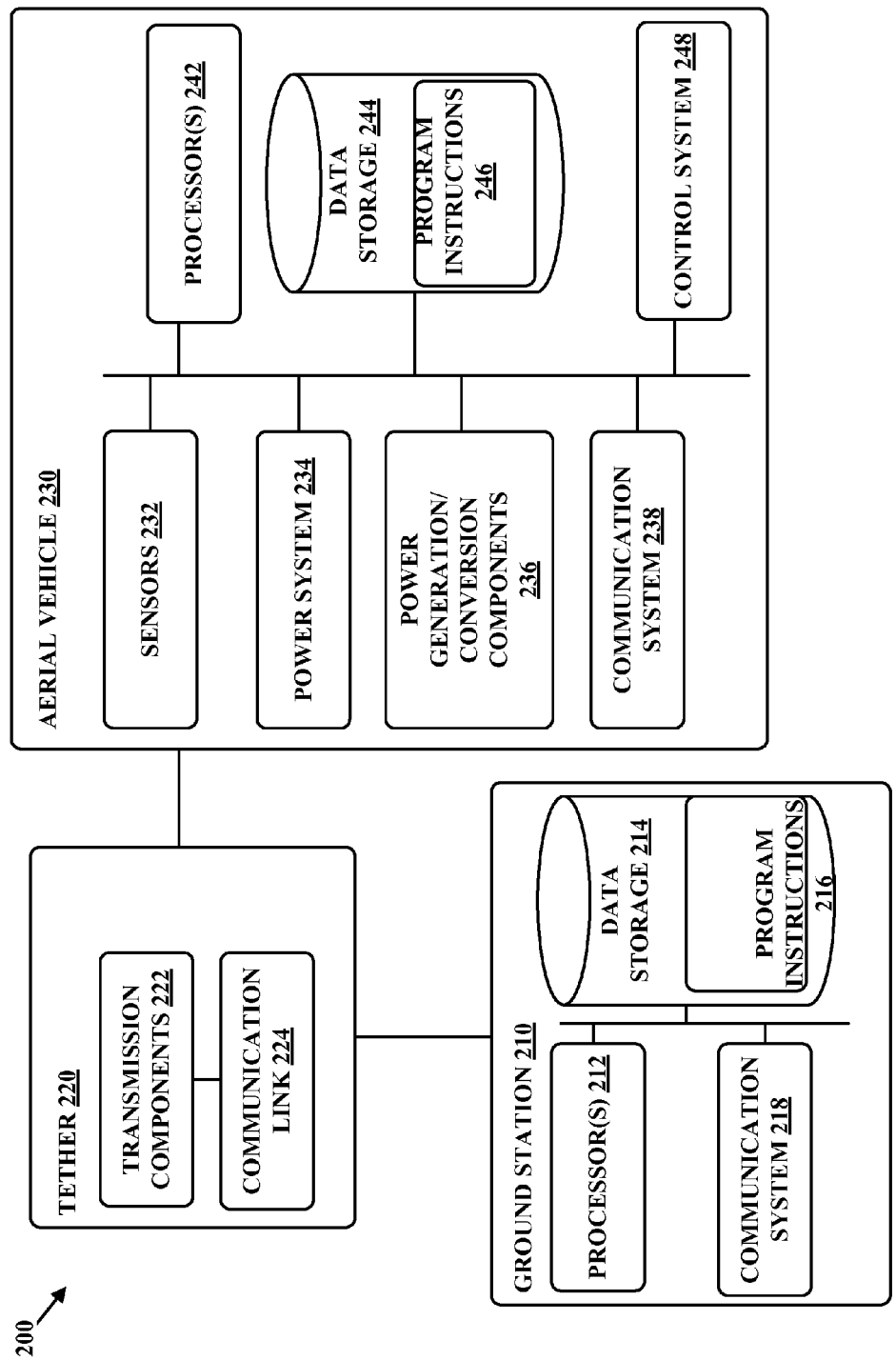
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more insulated conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. For example, vehicle 230 may employ drift mitigation through fault tolerant redundant position and velocity estimations. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power in wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable vehicle that is connected to a tether, such as the tether 230 and/or the tether 110.

C. Illustrative Components of a Winch Drum Clutch Mechanism

All figures in this description are representational only and not all components are shown. For example, additional structural or restraining components may not be shown.

FIGS. 3A, 3B, 3C, and 3D illustrate a winch drum assembly for an aerial vehicle of an AWT, such as the aerial vehicle 130 illustrated in FIG. 1, according to an example embodiment. The winch drum assembly 300 may be the same or similar to ground station 210 of FIG. 2, or ground station 110 of FIG. 1. FIGS. 3A, 3B, 3C, and 3D are representational only and not all components are shown. For example, additional structural or restraining components may not be shown.

Winch drum assembly 300 may include a base platform 310, a support bracket 320, a winch drum 330, a drive shaft 340, a tether 350, a tether gimbal assembly 356, and a motor 360. The motor may include motor housing 361 with at least one protrusion 362, motor drive 363, and motor output shaft 364. In a further aspect, the at least one protrusion 362 may be a paddle-shaped protrusion. Motor drive 363 may be any type of drive, such as a conventional electric motor that may utilize the interaction between a magnetic field and winding currents to generate force within a stator and rotor configuration.

It may be desirable to disengage motor 360 from winch drum 330, for example, to help reduce wear on a drivetrain and/or to help reduce loads on a drivetrain. Additionally, it may be desirable to disengage motor 360 so the motor does not act as a generator or provide feedback in the case where it is forced to turn via the motor output shaft while no power, or reduced power, is applied to the motor.

Figure 3A:
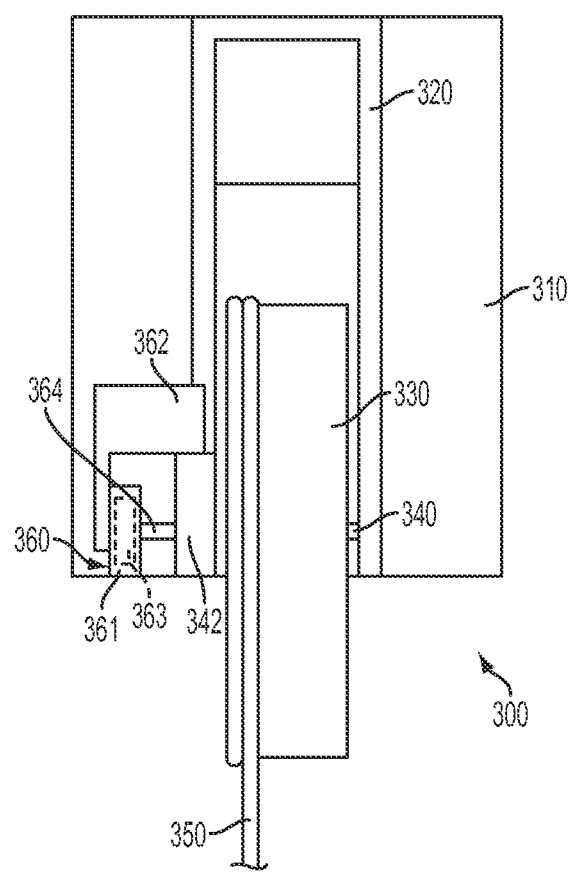
FIG. 3A is a top view of a winch drum assembly for an aerial vehicle of an AWT, according to an example embodiment.

FIG. 3A is a top view of a winch drum assembly for an aerial vehicle of an AWT, according to an example embodiment. As shown in FIG. 3A, support bracket 320 may be coupled to base platform 310. Winch drum 330 may be coupled to support bracket 320 via a drive shaft 340 extending through a central axis of winch drum 330, where winch drum 330 is rotatable about the central axis. A drivetrain 342 may be connected to driveshaft 340. A tether 350 may contact an exterior surface of winch drum 330. For example, tether 350 may be wound or unwound about an exterior winding surface of winch drum 330. In a further aspect, tether 350 may act as a rotational force about winch drum 330. For example, tether 350 may act to rotate winch drum 330 through some range of motion when tether 350 is connected to an aerial vehicle of an AWT and the aerial vehicle is in cross-wind flight. During this mode of operation, the aerial vehicle may be flying in a path, such as a substantially circular path, and tether 350 may both rotate along its length and oscillate in elevation, thus oscillating winch drum 330 within a range of rotational motion about the central axis of winch drum 330.

Figure 3B:
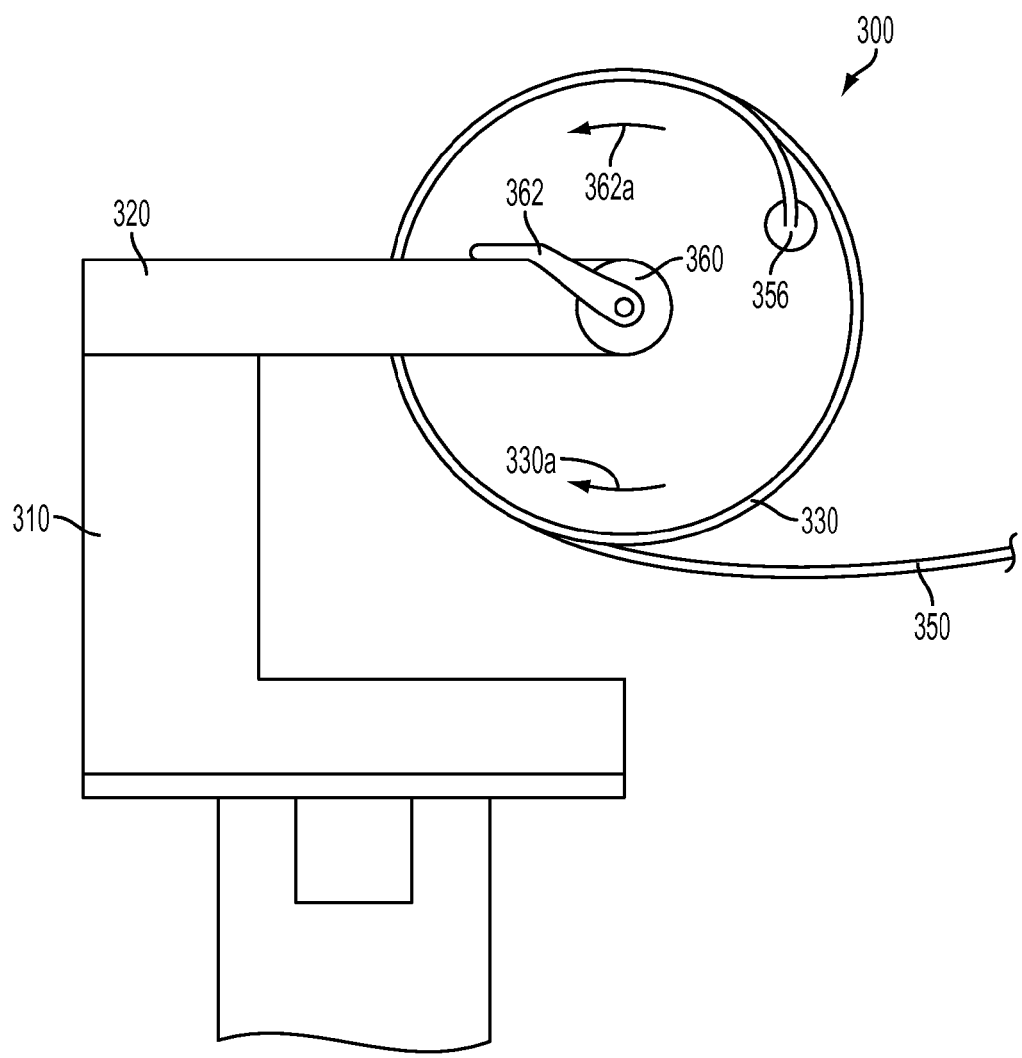
FIG. 3B is a side view of a winch drum assembly for an aerial vehicle of an AWT with a motor in an engaged position, according to an example embodiment.
Figure 3C:
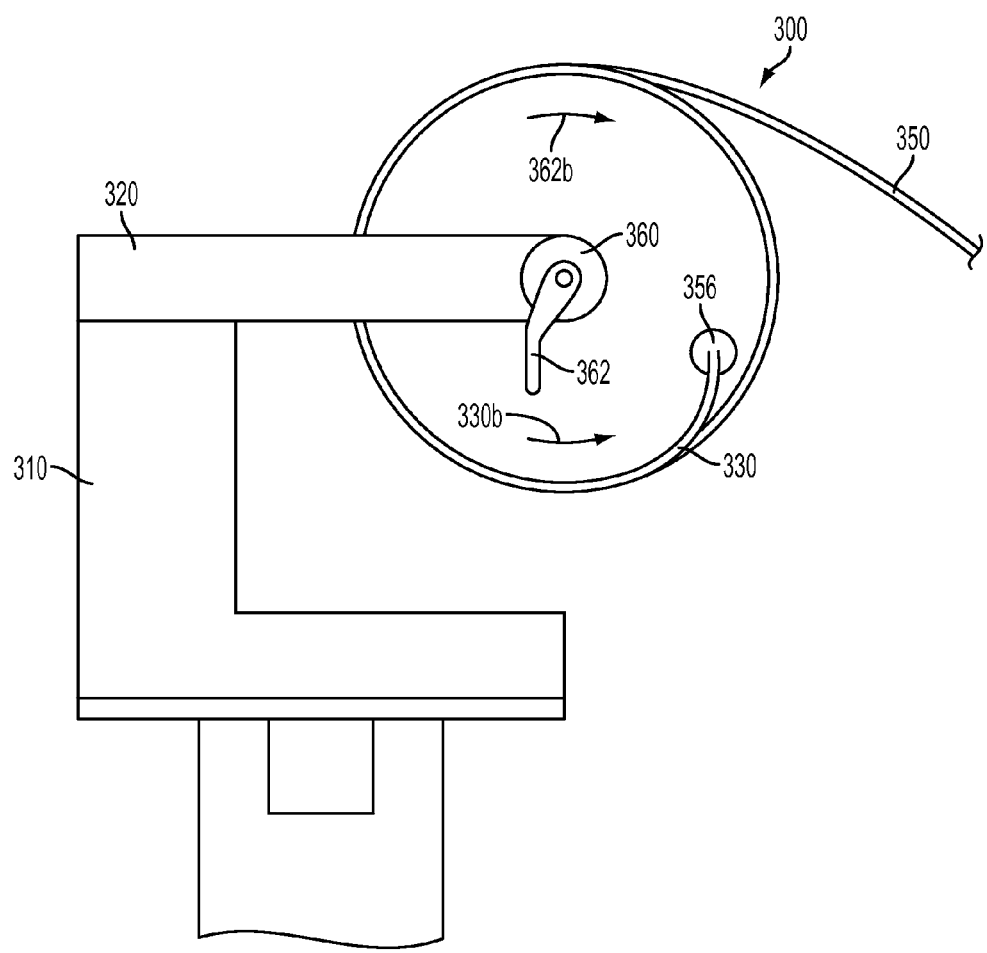
FIG. 3C is a side view of a winch drum assembly for an aerial vehicle of an AWT with a motor in an engaged position, according to an example embodiment.
Figure 3D:
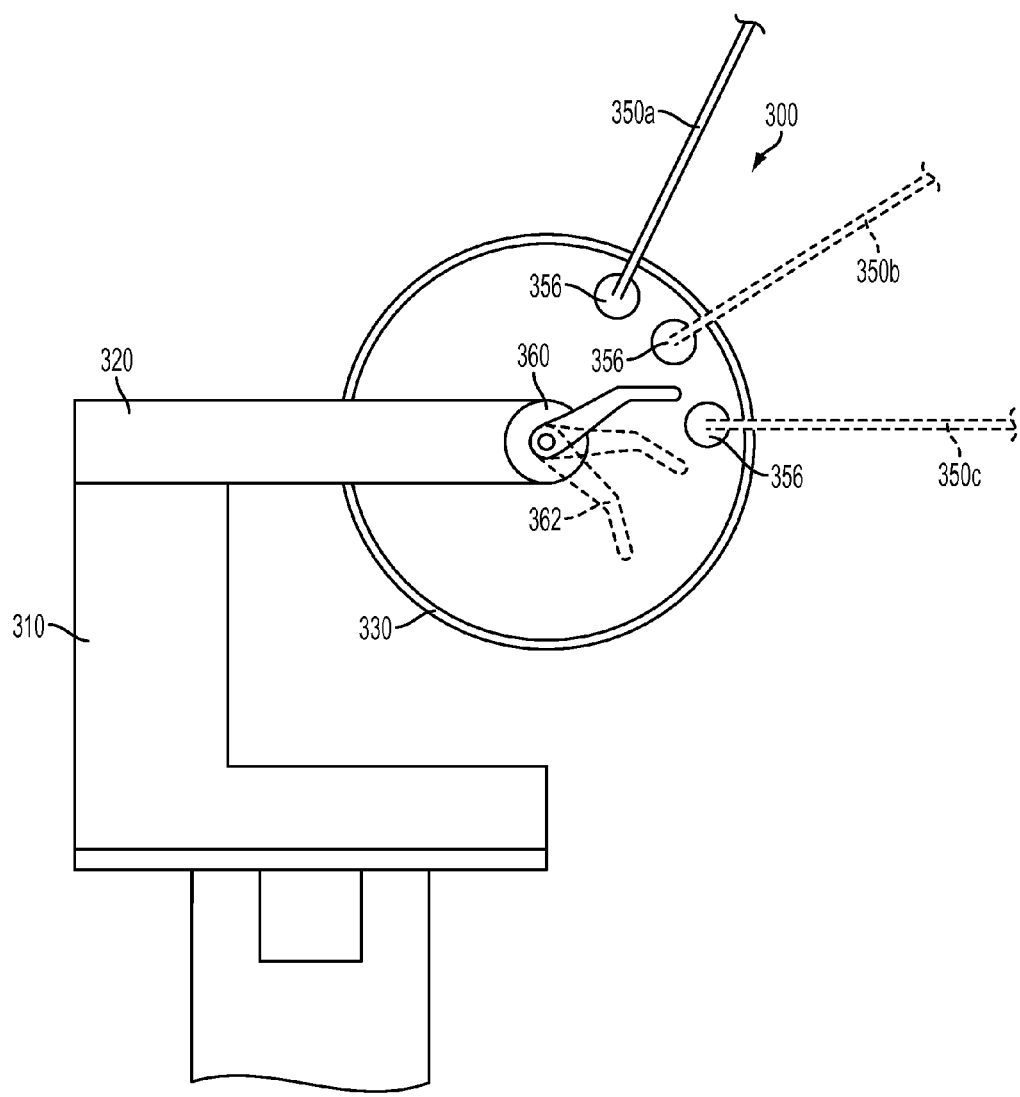
FIG. 3D is a side view of a winch drum assembly for an aerial vehicle of an AWT with a motor in a disengaged position, according to an example embodiment.

Tether 350 may be coupled to tether gimbal assembly 356 (shown in FIGS. 3B, 3C, and 3D). Tether gimbal assembly 356 may be configured to rotate about one or more axes to assist the portion of the tether 350 at the drum to more closely follow the path of the aerial vehicle during crosswind flight. For example, tether gimbal assembly may be configured to rotate about two axes, such as an altitude axis and an azimuth axis.

Motor output shaft 364 may be coupled to drivetrain 342. Motor housing 361 may be coupled to motor drive 363 and may include one or more protrusion 362. Further, motor housing 361 may be configured to rotate about motor output shaft 364 and relative to base platform 310.

In operation, if motor 360 is activated, motor output shaft 364 may rotate within motor housing 361, or motor housing 361 may rotate about motor output shaft 364, depending on which component is subject to a greater load force acting against the rotation. If motor housing 361 experiences the greater load (for example, if motor housing 361 is mounted in a fixed position and motor output shaft 364 is subject to some non-fixed load), then motor drive 363 may spin motor output shaft 364. This condition, where motor housing 361 experiences a greater load than motor output shaft 364 may be referred to as motor 360 being "engaged." In contrast, if motor output shaft 364 experiences the greater load (for example, if motor housing 361 is unfixed and left free to rotate, while winch drum 330 and tether 350 act as a load on motor output shaft 364), then motor drive 363 may spin motor housing 361. This condition, where motor output shaft 364 experiences a greater load than motor housing 361 may be referred to as motor 360 being "disengaged."

To switch between the engaged and disengaged conditions, motor housing 361 may include one or more protrusions 362 configured to constrain the free rotation of motor housing 361 (relative to winch assembly 300) to within a range of rotational motion. A stop block (shown in FIG. 3A as support bracket 320) may be located in proximity to motor housing 361 such that rotation of motor housing 361 in a first direction causes protrusion 362 to contact the stop block and prevent further rotation of motor housing 361 in the first direction. Thus, the motor 360 may be engaged. For example, motor housing 361 may experience a greater load than motor output shaft 364 and the motor torque will be directed to rotation of motor output shaft 364 as opposed to further rotation of motor housing 361.

In a further aspect, winch assembly 300 may be configured to stop rotation of motor housing 361 in a second direction opposite the first direction at some point at or less than a full rotation back to the first stop block. For example, as shown in FIG. 3A, protrusion 362 may come into contact with support bracket 320 regardless of which direction protrusion (and motor housing 361) rotate. For example, if the bracket has such a height that it takes up 10 degrees of rotational freedom, protrusion 362 will be able to rotate for 350 degrees before protrusion 362 contacts support bracket 320 and prevents protrusion 362 (and motor housing) from rotating further. This is illustrated and described further in reference to FIG. 3D.

In a further aspect, tether 350 may have a proximate tether end and a distal tether end. The proximate tether end may be coupled to a tether termination mount 380 that may be coupled to winch drum 330 and configured to constrain a portion of tether 350. For example, the tether termination mount may be a two axis gimbal mount that may be configured to allow for rotation about two axes, such as an altitude axis and an azimuth axis. The distal tether end may be coupled to an aerial vehicle of an AWT.

FIG. 3B illustrates a side view of a winch assembly with the motor engaged, according to an example embodiment. Winch assembly 300 may include a base platform 310, a support bracket 320, a drum 330, a drivetrain, a tether 350, a motor 360, and a protrusion 362. Winch assembly 300 components may be connected and operate in a same or similar manner to as described previously.

FIG. 3B is a side view of a winch drum assembly for an aerial vehicle of an AWT with a motor in an engaged position, according to an example embodiment. In operation in this configuration, if motor 360 is activated in a first motor direction (representatively shown in FIG. 3B by arrow 362a), motor housing 361 may experience a greater load than the motor output shaft because protrusion 362 is contacting the stop block. Thus, motor housing 361 behaves as if it were mounted in a fixed position and, because motor output shaft 364 is subject to some non-fixed load, then motor drive 363 may spin motor output shaft 364. Consequentially, winch drum 330 will rotate about its central axis in a first drum direction (representatively shown in FIG. 3B by arrow 330a). As a result of rotation of winch drum 330, tether 350 will be wound on winch drum 330. Alternatively, winch drum assembly may be configured such that rotation of winch drum 330 in the first direction unwinds tether 350 from winch drum 330. Tether gimbal assembly 356 may constrain a portion of tether 350. For example, tether 350 may pass through a tether gimbal assembly 356 prior to being wound on winch drum 330. Consequentially, when tether 350 fully unwinds from about the exterior of winch drum 330, tether 350 extends out from tether gimbal assembly 356 to the aerial vehicle.

As described previously, protrusion 362 may also prevent rotation of the motor housing in a second motor direction. For example, if winch assembly 300 is configured as shown in FIG. 3B and motor 360 is activated in a second motor direction that is opposite the first motor direction (i.e., opposite the direction of arrow 362a), motor 360 may become disengaged. Motor 360 (along with motor housing 361 and protrusion 362) may then rotate about winch drum 330 central axis in the second motor direction until protrusion 362 contacts the bottom side of support bracket 320. At that point, motor 360 may again become engaged.

FIG. 3C is a side view of a winch drum assembly for an aerial vehicle of an AWT with a motor in an engaged position, according to an example embodiment. Winch assembly 300 may include a base platform 310, a support bracket 320, a drum 330, a drivetrain (not shown), a tether 350, a tether gimbal assembly 356, a motor 360, and a protrusion 362. Winch assembly 300 components may be connected as described previously.

As described in the previously, winch assembly 300 may start at the first engaged position and may then become disengaged when motor 360 is activated in the second motor direction (representatively shown in FIG. 3C by arrow 362b). Motor housing 361 may then rotate about winch drum 330 central axis in the second direction until protrusion 362 contacts the bottom side of the stop block (illustrated in FIG. 3C as support bracket 320). At that point, motor 360 may become engaged in a second position.

In operation in this second engaged configuration, if motor 360 is activated in the second motor direction, motor housing 361 may experience a greater load than the motor output shaft because protrusion 362 is contacting the bottom side of the stop block (illustrated in FIG. 3C as support bracket 320). Thus, motor housing 361 behaves as if it were mounted in a fixed position and, because motor output shaft 364 is subject to some non-fixed load, then motor drive 363 may spin motor output shaft 364. Consequentially, winch drum 330 will rotate about its central axis in a second drum direction (representatively shown in FIG. 3B by arrow 330*b*). As a result of rotation of winch drum 330, tether 350 will be wound on winch drum 330.

FIG. 3D is a side view of a winch drum assembly for an aerial vehicle of an AWT with a motor in a disengaged position, according to an example embodiment. This configuration permits some components of winch assembly 300 to freely spool during some modes of operation of the AWT. For example, in cross-wind flight, protrusion 362 may be rotated relative to support bracket 320 (or other stop block) such that protrusion 362 and support bracket 320 do not come into contact. When the motor is turned off, or has reduced power, tension force from tether 350 may cause winch drum 330 to rotate independent of input from the motor output shaft. During cross-wind flight, tether 350 may be completely unwound from the exterior surface of winch drum 330 and extend from tether gimbal assembly 356 towards the aerial vehicle. As a result, winch drum 330 may rotate in an oscillatory manner in response to the flight path of the aerial vehicle. Because the motor housing is unrestrained and still coupled to winch drum 330, motor 360 and winch drum 330 may rotate substantially together about the central axis of winch drum 330. In other words, motor 360 may oscillate in the same manner as winch drum 330 when the motor is turned off, or has reduced power, and protrusion 362 is not in contact with a stop block, such as support bracket 320.

In a further aspect, the stop block (for example, support bracket 320) and/or protrusion 362 may be configured for damping. For example, the stop block may include a damper, such as a mass-spring damper, that helps reduce the impact of protrusion 362 on the stop block. Alternatively or additionally, protrusion 362 may include a damper, such as a mass-spring damper, that helps reduce the impact of protrusion 362 on the stop block. Other damping systems may also be used; for example, compressible materials, gas or hydraulic cylinders, springs, or other damping systems may be used.

Figure 4A:
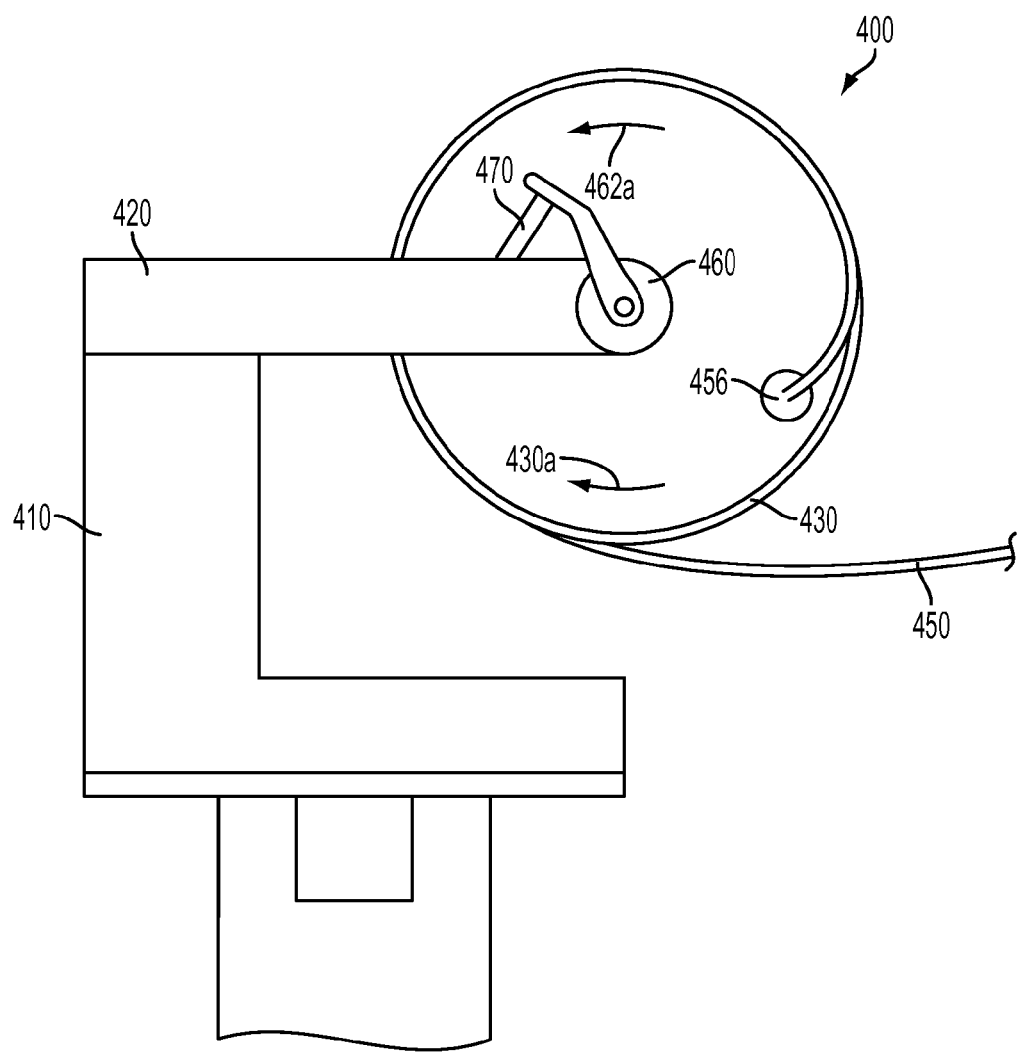
FIG. 4A is a side view of a winch drum assembly for an aerial vehicle of an AWT with a motor in an engaged position and a stop block, according to an example embodiment.

FIG. 4A is a side view of a winch drum assembly for an aerial vehicle of an AWT with a motor in an engaged position and a stop block, according to an example embodiment. Winch assembly 400 may include base platform 410, support bracket 420, winch drum 430, drivetrain (not shown), tether 450, tether gimbal assembly 456, motor 660, and protrusion 462 that are connected and operate in the same or similar manner as previously described in reference to FIGS. 3A, 3B, 3C, and 3D.

Winch assembly 400 may further include stop block 470. Stop block 470 may be located in proximity to protrusion 462 of motor 460 such that rotation of motor housing 461 in a first motor direction (representatively shown in FIG. 4 as arrow 462*a*) causes protrusion 462 to contact stop block 470 and prevent further rotation of motor 460 about the motor output shaft in the first direction.

As illustrated in FIG. 4A, stop block 470 may be used to reduce the amount of rotational freedom of motor 460 in a first motor direction, as compared to a winch assembly without stop block 470 (such as winch assembly 300). In a further aspect, stop block 470 may be removable or adjustable. For example, different operational modes may benefit from more or less rotational freedom. For example, an aerial vehicle may have various flight paths. Some flight paths, such as a horizontal FIG. 8 flight path, may have larger oscillations than others and may benefit from more rotational freedom for motor 460. Thus, stop block 470 may be removed, adjusted, or moved out of proximity of protrusion 462, to enable more rotation freedom for motor 460. Likewise, stop block 470 may be extendable to have less rotational freedom for motor 460.

Figure 4B:
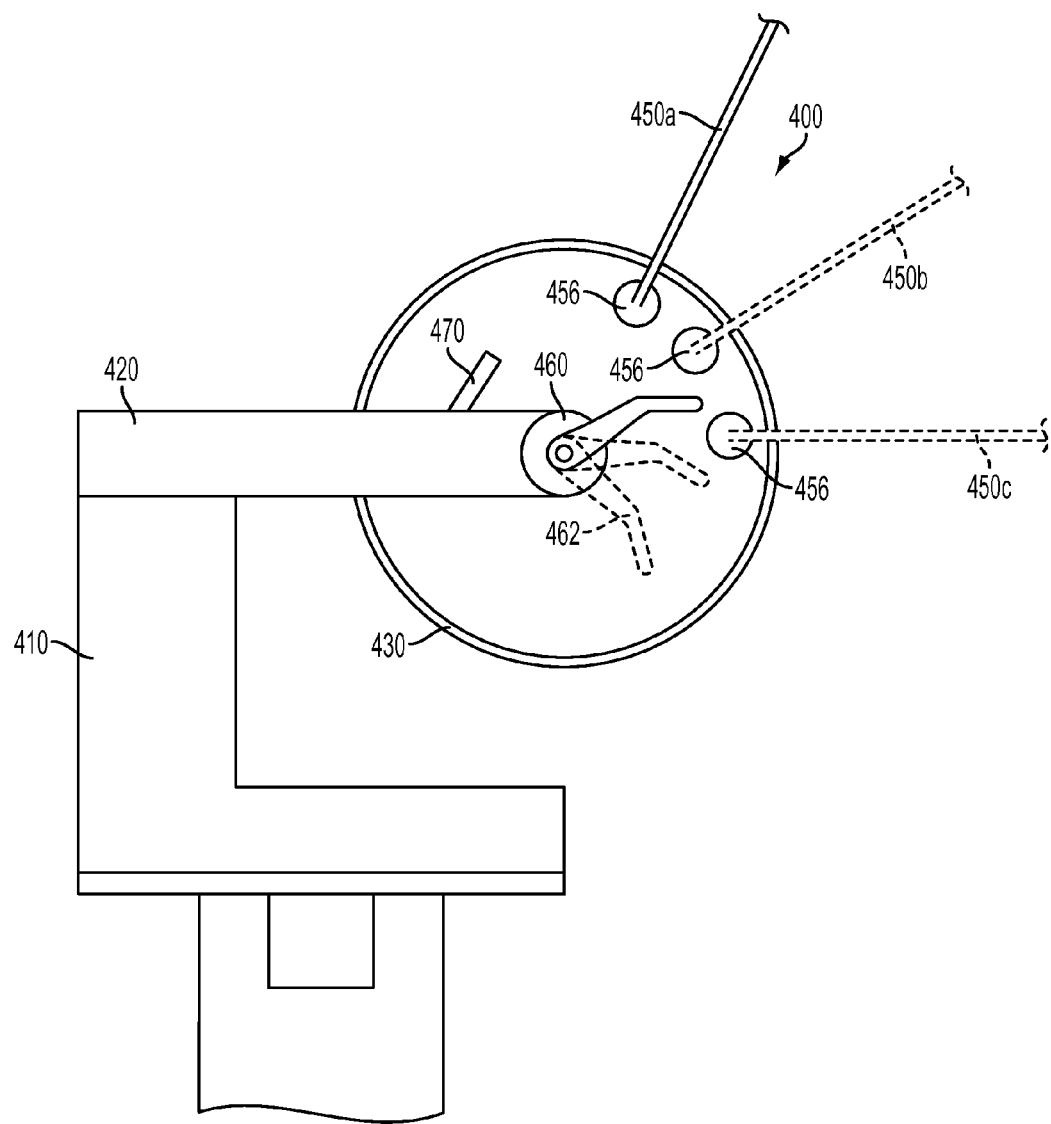
FIG. 4B is a side view of a winch drum assembly for an aerial vehicle of an AWT with a motor in a disengaged position and a stop block, according to an example embodiment.

FIG. 4B is a side view of a winch drum assembly for an aerial vehicle of an AWT with a motor in a disengaged position and a stop block, according to an example embodiment. Winch assembly 400 may be configured to freely spool during some modes of operation of the AWT. For example, in cross-wind flight, protrusion 462 may be rotated relative to stop block 470 such that protrusion 462 and stop block 470 do not come into contact. When the motor is turned off, or has reduced power, tension force from tether 450 may cause winch drum 430 to rotate. For example, winch drum 430 may rotate in an oscillatory manner. Because the motor housing is unrestrained and still coupled to winch drum 430, motor 460 may rotate substantially together about the central axis of winch drum 430. In other words, motor 460 may oscillate in the same manner as winch drum 430 when the motor is turned off, or has reduced power, and protrusion 462 is not in contact with stop block 470. Additionally, motor 460 may be restrained in a second motor direction opposite the first motor direction as described previously.

Figure 5A:
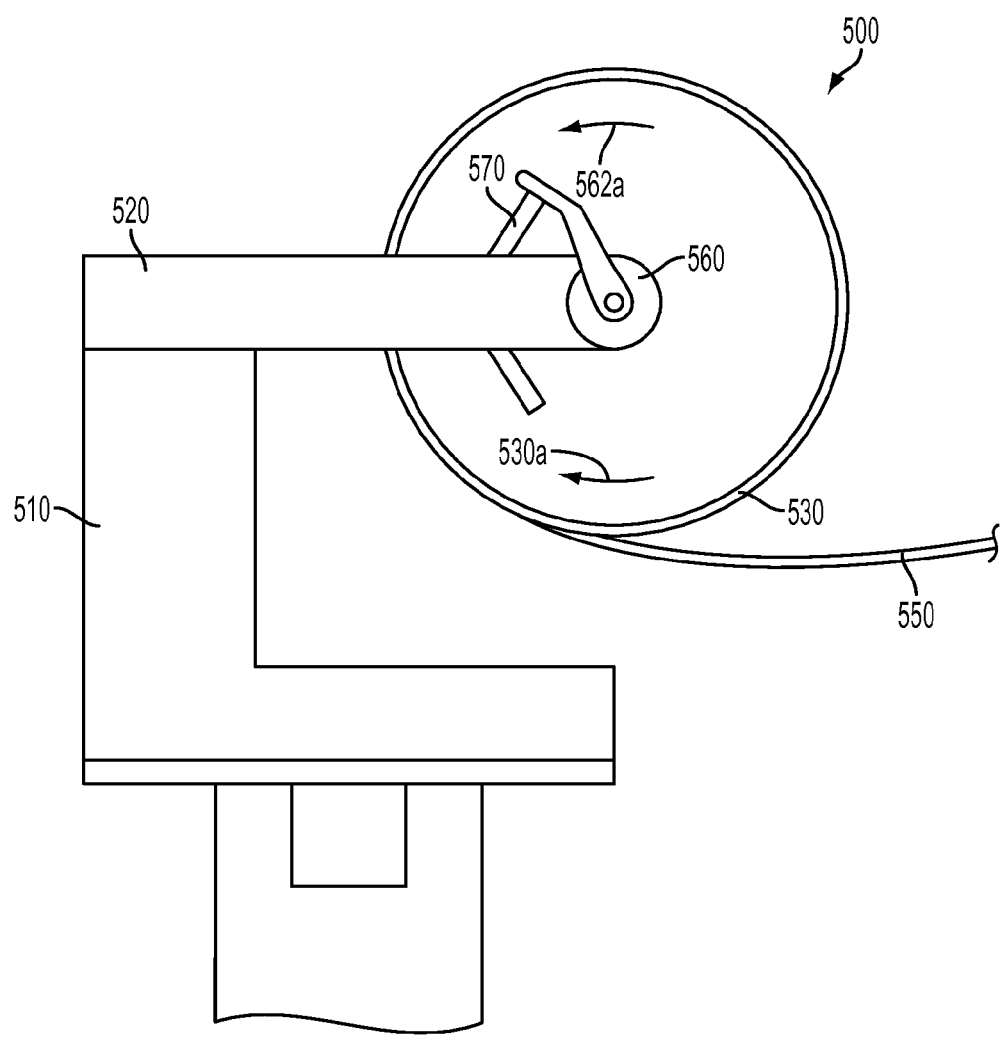
FIG. 5A is a side view of a winch drum assembly for an aerial vehicle of an AWT with a motor in an engaged position and two stop blocks, according to an example embodiment.

FIG. 5A is a side view of a winch drum assembly for an aerial vehicle of an AWT with a motor in an engaged position and two stop blocks, according to an example embodiment. Winch assembly 500 may include base platform 510, support bracket 520, winch drum 530, drivetrain (not shown), tether 550, tether gimbal assembly 556, protrusion 562, motor 560 and a stop block 570A that are connected and operate in the same or similar manner as previously described, such as for winch assembly 400. For example, stop block 570A may be the same or similar to, and operate in the same manner or similar manner to, stop block 470.

Winch assembly 500 may further include a second stop block 570B. Stop block 570B may be located in proximity to protrusion 562 of motor 560. In this configuration with two stop blocks, rotation of the motor housing in either direction 562*a* or 530*a* causes protrusion 562 to contact either stop blocks 570A or 570B and prevent further rotation of motor 560 about the motor output shaft in the direction of rotation. As illustrated in FIG. 5A, stop blocks 570A and 570B may be used to reduce the amount of rotational freedom in both directions of rotation, as compared to a winch assembly without stop blocks 570A and 570B (such as winch assembly 300). In a further aspect, stop blocks 570A and 570B may be removable or adjustable. For example, different operational modes may benefit from more or less rotational freedom. For example, an aerial vehicle may have various flight paths. Some flight paths, such as a horizontal FIG. 8 flight path, may have larger oscillations than others and may benefit from more rotational freedom for motor 560. Thus, stop blocks 570A and 570B may be removed, adjusted, or moved out of proximity of protrusion 562, to enable more rotational freedom for motor 560. Likewise, stop blocks 570A and 570B may be extendable for less rotational freedom for motor 560.

Figure 5B:
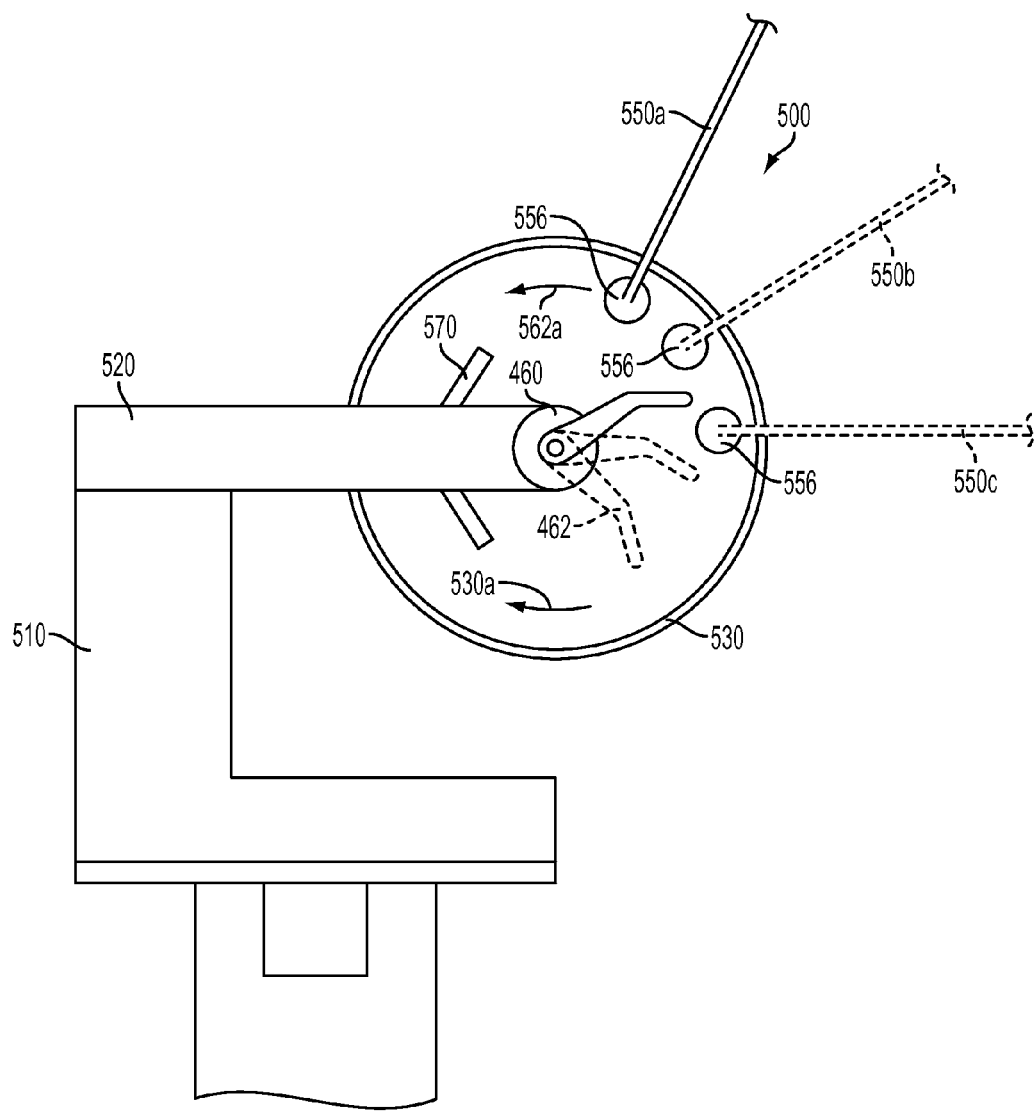
FIG. 5B is a side view of a winch drum assembly for an aerial vehicle of an AWT with a motor in a disengaged position and two stop blocks, according to an example embodiment.

FIG. 5B is a side view of a winch drum assembly for an aerial vehicle of an AWT with a motor in a disengaged position and two stop blocks, according to an example embodiment. Winch assembly 500 may be configured to freely spool during some modes of operation of the AWT, in the same or similar manner to winch assembly 400. For example, in cross-wind flight, protrusion 562 may be rotated relative to stop block 570B such that protrusion 562 and stop block 570B do not come into contact. When motor 560 is turned off, or has reduced power, tension force from tether 550 may cause winch drum 530 to rotate. For example, winch drum 530 may rotate in an oscillatory manner. Because the motor housing is unrestrained and still coupled to winch drum 530, motor 560 may rotate substantially together about the central axis of winch drum 530. In other words, motor 560 may oscillate in the same manner as winch drum 530 when motor 560 is turned off, or has reduced power, and protrusion 562 is not in contact with a stop block, such as stop blocks 570A and 570B.

Figure 6A:
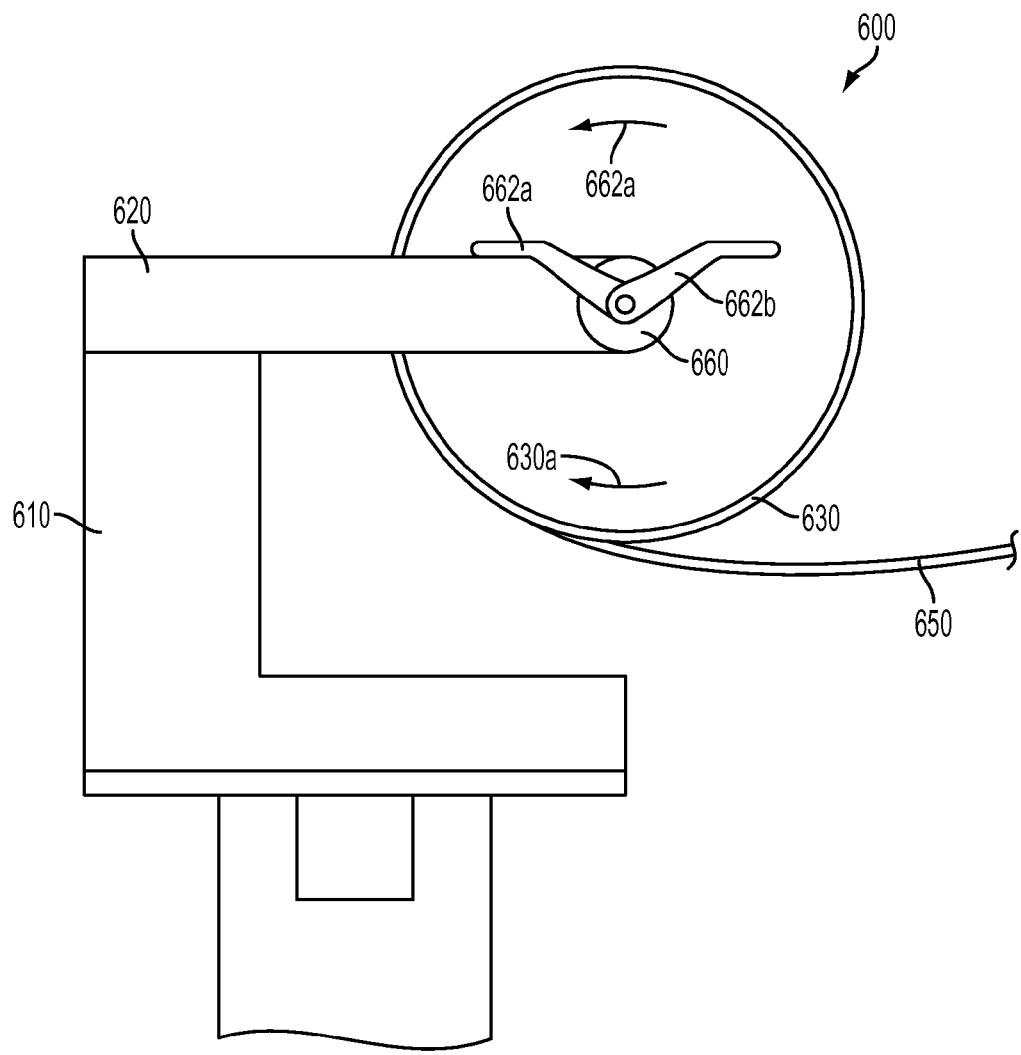
FIG. 6A is a side view of a winch drum assembly for an aerial vehicle of an AWT with a motor in an engaged position and two protrusions, according to an example embodiment.

FIG. 6A is a side view of a winch drum assembly for an aerial vehicle of an AWT with a motor in an engaged position and two protrusions, according to an example embodiment. Winch assembly 600 may include a base platform 610, a support bracket 620, a winch drum 630, a drivetrain (not shown), a tether 650, a tether gimbal assembly 656, motor 660, and a protrusion 662A that are connected as previously described. For example, protrusion 662A may be the same or similar to, and operate in the same manner or similar to, protrusion 462. A stop block, such as support bracket 620, may be located in proximity to protrusions 662A and 662B of motor 660 such that rotation of the motor housing in a first direction (representatively shown in FIG. 6 as arrow 662c) causes protrusion 662A to contact support bracket 620 and prevent further rotation of motor 660 about the motor output shaft in the first direction. The motor may then be engaged in a first direction such that the motor output shaft turns winch drum in a second direction (representatively shown in FIG. 6 by arrow 630a). Likewise, rotation of motor 660 in a second direction (e.g., the direction represented by arrow 630a) opposite the first direction causes protrusion 662B to become disengaged. Further rotation of motor 660 in the second direction causes protrusion 662B to contact the bottom side of support bracket 620 and prevent further rotation of motor 660 about the motor output shaft in the second direction. The motor may then be engaged in the second direction. Consequentially, the motor output shaft may turn winch drum 630 in the first direction (e.g., the direction represented by arrow 662c).

As illustrated in FIG. 6A, protrusions 662A and 662B may be used to reduce the amount of rotational freedom in two directions, as compared to a winch assembly with only one protrusion (such as winch assembly 300). In a further aspect, one or both of the protrusions 662A and 662B may be removable or adjustable. For example, different operational modes may benefit from more or less rotational freedom. For example, an aerial vehicle may have various flight paths. Some flight paths, such as a horizontal FIG. 8 flight path, may have larger oscillations than others and may benefit from more rotational freedom for motor 460. Thus, one of protrusions 662A or 662B may be removed, adjusted, or moved out of proximity of protrusion the stop block, to enable more or less rotational freedom for motor 660. In a further aspect, protrusions 662A and 662B may be configurable to have more or less rotational freedom for motor 660. For example, protrusions 662A and 662B may be movably coupled to motor housing such that protrusions 662A and 662B may be moved closer together or further apart in relation to each other. In this way, motor 660 may experience more degrees of rotational freedom as protrusions 662A and 662B move closer together in relation to each other. Likewise, motor 660 may experience fewer degrees of rotational freedom as protrusions 662A and 662B move further apart in relation to each other.

Figure 6B:
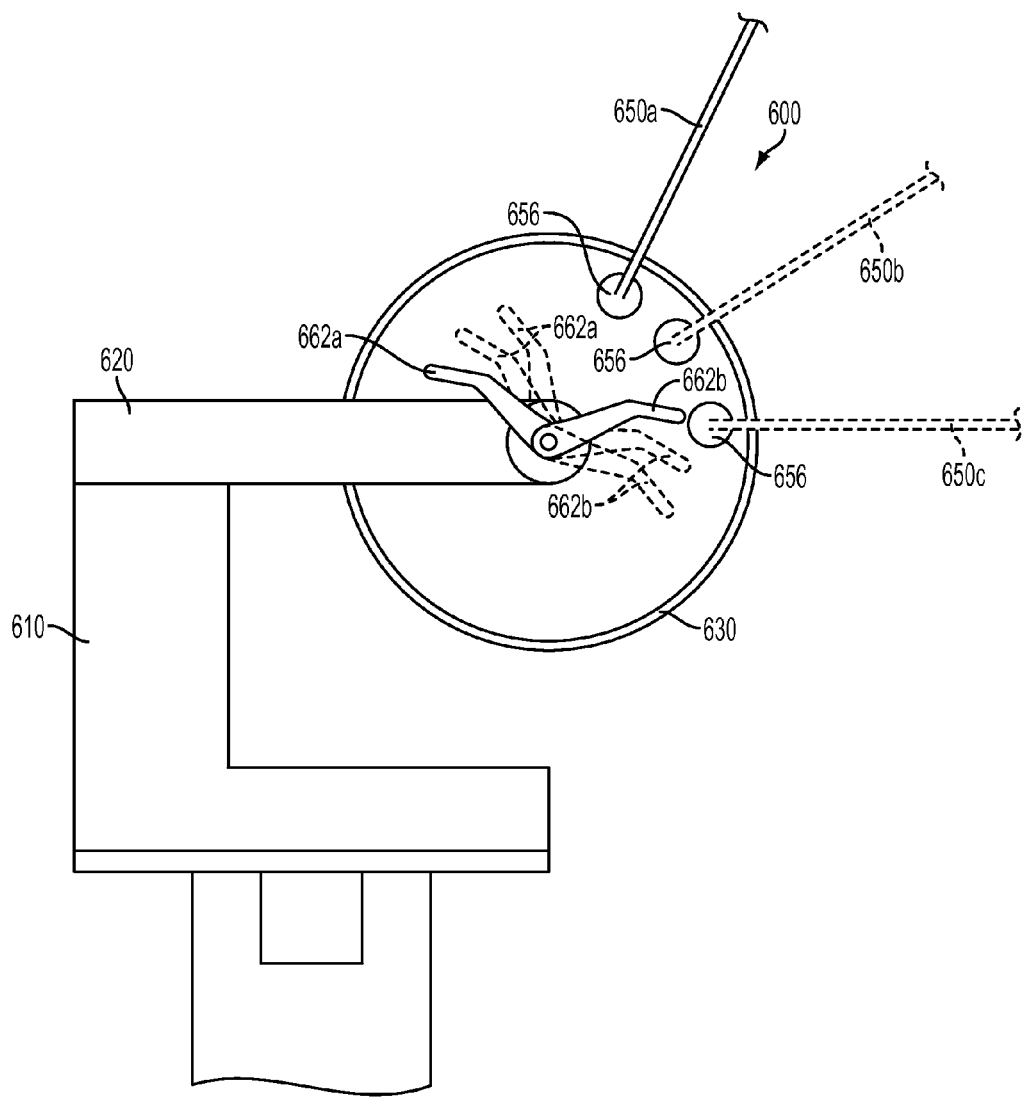
FIG. 6B is a side view of a winch drum assembly for an aerial vehicle of an AWT with a motor in a disengaged position and two protrusions, according to an example embodiment.

FIG. 6B is a side view of a winch drum assembly for an aerial vehicle of an AWT with a motor in a disengaged position and two protrusions, according to an example embodiment. Winch assembly 600 may be configured to freely spool during some modes of operation of the AWT. For example, in cross-wind flight, protrusions 662A and 662B may be rotated relative to the stop block (shown in FIG. 6 as support bracket 620) such that protrusions 662A and 662B and the stop block do not come into contact. When the motor is turned off, or has reduced power, tension force from tether 650 may cause winch drum 630 to rotate. For example, winch drum 630 may rotate in an oscillatory manner. Because the motor housing is unrestrained and still coupled to winch drum 630, motor 660 may rotate substantially together about the central axis of winch drum 630. In other words, motor 660 may oscillate in the same manner as winch drum 630 when the motor is turned off, or has reduced power, and protrusions 662A and 662B are not in contact with stop block 670.

Figure 6C:
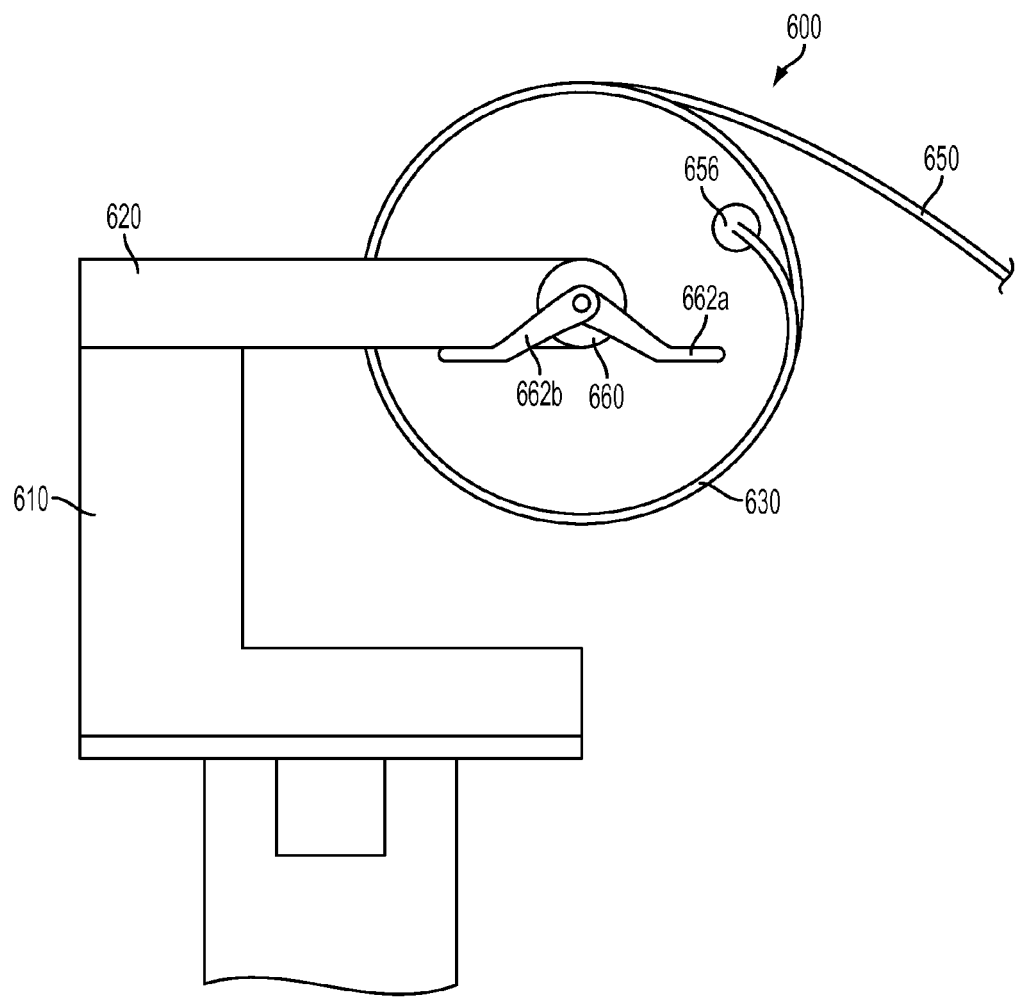
FIG. 6C is a side view of a winch drum assembly for an aerial vehicle of an AWT with a motor in an engaged position and two protrusions, according to an example embodiment.

FIG. 6C is a side view of a winch drum assembly for an aerial vehicle of an AWT with a motor in an engaged position and two protrusions, according to an example embodiment. Winch drum assembly 600 may have the same or similar components and may operate in the same or similar manner as described above in reference to FIG. 6A.

x. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:
1. A winch drum assembly, comprising:
a base platform;
a support bracket coupled to the base platform;
a winch drum rotatably coupled to the support bracket via a drive shaft, wherein the winch drum acts as a rotational load on the drive shaft;
a tether with a first end coupled to the winch drum, wherein the tether is configured to be wound or unwound from about the winch drum as the winch drum rotates;
a drivetrain coupled to the drive shaft;
a motor comprising:
a motor drive;
a motor output shaft coupled to the drivetrain; and
a motor housing including at least one protrusion, wherein the motor housing is configured to rotate about the motor output shaft and relative to the support bracket; and
a stop block located in proximity to the motor such that rotation of the motor drive in a first direction causes the at least one protrusion to contact the stop block and prevent further rotation of the motor drive about the motor output shaft in the first direction.
2. The assembly of claim 1, wherein the stop block is further configured such that rotation of the motor housing in a second direction opposite the first direction causes the at least one protrusion to contact the stop block and prevents further rotation of the motor housing about the motor output shaft in the second direction.
3. The assembly of claim 1, wherein the stop block is coupled to the support bracket.

4. The assembly of claim 1, wherein the protrusion is a paddle.

5. The assembly of claim 1, further comprising a second stop block located in proximity to the motor housing such that rotation of the motor housing in a second direction causes the at least one protrusion to contact the second stop block and to prevent further rotation of the motor housing about the motor output shaft in the second direction.

6. The assembly of claim 1, further comprising a second protrusion coupled to the motor housing, wherein rotation of the motor housing in a second direction causes the second protrusion to contact the stop block and to prevent further rotation of the motor housing about the motor output shaft in the second direction.

7. The assembly of claim 1, further comprising a damping system coupled to the stop block.

8. The assembly of claim 7, wherein the damping system is a mass spring damper system.

9. The assembly of claim 1, further comprising a damping system coupled to the protrusion.

10. The assembly of claim 9, wherein the damping system is a mass spring damper system.

11. The assembly of claim 1, wherein the assembly is configured such that wherein the tether is fully unwound from about the winch drum, and wherein the tether exerts tension on the winch drum causing the winch drum to oscillate through a range of rotation, the at least one protrusion is rotationally oriented such that the at least one protrusion does not contact the stop block during the oscillation.

12. A system, comprising:
a base platform;
a support bracket coupled to the base platform;
a winch drum rotatably coupled to the support bracket via a drive shaft, wherein the winch drum acts as a rotational load on the drive shaft;
a tether, comprising:
a proximate tether end; and
a distal tether end;
wherein the tether is configured to be wound or unwound about the winch drum as the winch drum rotates;
a drivetrain coupled to the drive shaft;
a motor comprising:
a motor drive;
a motor output shaft coupled to the drivetrain; and
a motor housing including at least one protrusion, wherein the motor housing is configured to rotate about the motor output shaft and relative to the support bracket; and
a stop block located in proximity to the motor such that rotation of the motor drive in a first direction causes the at least one protrusion to contact the stop block and prevent further rotation of the motor drive about the motor output shaft in the first direction;
a tether termination mount coupled to the winch drum, wherein the proximate tether end terminates at the tether termination mount; and
an aerial vehicle coupled to the distal tether end.

13. The system of claim 12, wherein the protrusion is a paddle.

14. The system of claim 12, further comprising a second stop block located in proximity to the motor housing such that rotation of the motor housing in a second direction causes the at least one protrusion to contact the second stop block and prevent further rotation of the motor housing about the motor output shaft in the second direction.

15. The system of claim 12, further comprising a second protrusion coupled to the motor housing, wherein rotation of the motor housing in a second direction causes the second protrusion to contact the stop block and prevents further rotation of the motor housing about the motor output shaft in the second direction.

16. The system of claim 12, further comprising a damping system coupled to the stop block.

17. The system of claim 12, further comprising a damping system coupled to the protrusion.

18. The system of claim 12, wherein the system is configured such that wherein the tether is fully unwound from about the winch drum, and wherein the tether exerts tension on the winch drum causing the winch drum to oscillate through a range of rotation, the at least one protrusion is rotationally oriented such that the at least one protrusion does not contact the stop block during the oscillation.

19. A winch drum assembly, comprising:
a base platform;
a support bracket coupled to the base platform;
a winch drum rotatably coupled to the support bracket via a drive shaft, wherein the winch drum acts as a rotational load on the drive shaft;
a tether with a first end coupled to the winch drum, wherein the tether is configured to be wound or unwound from about the winch drum as the winch drum rotates;
a drivetrain coupled to the drive shaft;
a motor comprising:
a motor drive;
a motor output shaft coupled to the drivetrain; and
a motor housing including at least one protrusion, wherein the motor housing is configured to rotate about the motor output shaft and relative to the support bracket;
wherein the support bracket is located in proximity to the motor such that rotation of the motor drive in a first direction causes the at least one protrusion to contact the support bracket and prevent further rotation of the motor drive about the motor output shaft in the first direction.

* * * * *